Aug. 11, 1942.  C. A. MARIEN  2,292,883
PISTON SKIRT EXPANDER
Filed Dec. 11, 1941
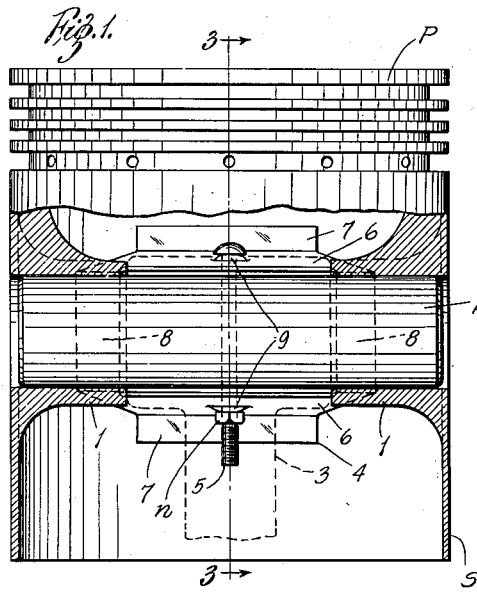
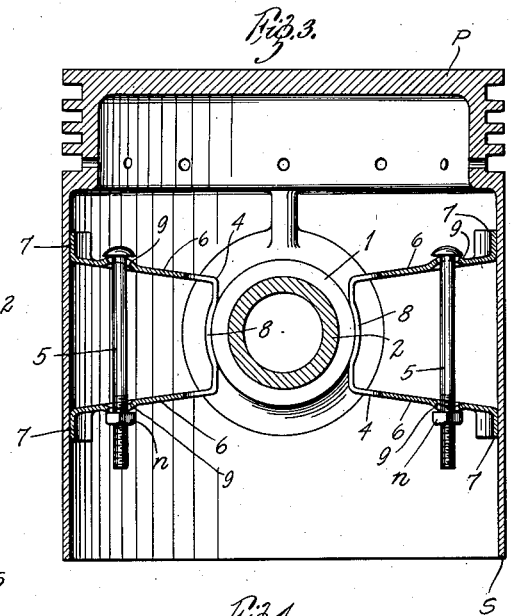
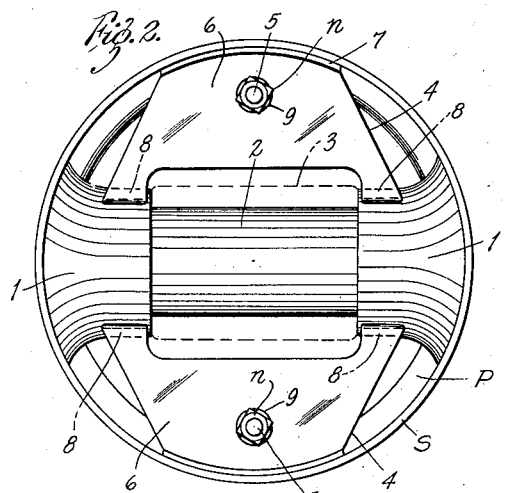
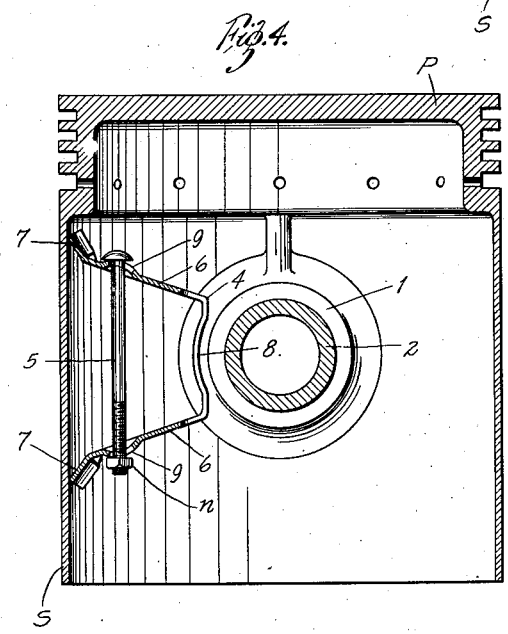
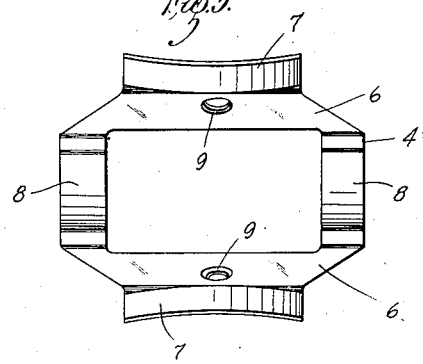
INVENTOR:
CHARLES A. MARIEN,
BY Harry A. Deumer
ATTORNEY.

Patented Aug. 11, 1942

2,292,883

UNITED STATES PATENT OFFICE 2,292,883

PISTON SKIRT EXPANDER

Charles A. Marien, St. Louis, Mo., assignor to Ramsey Accessories Manufacturing Corporation, St. Louis, Mo., a corporation of Missouri Application December 11, 1941, Serial No. 422,496

8 Claims. (Cl. 309—12)

My invention has relation to improvements in expansion and tensioning devices for pistons, which devices are commonly called piston skirt expanders, and it consists in the novel features of construction more fully set forth in the specification and pointed out in the claims.

The present invention has for its object the expanding and reshaping of a deformed piston skirt by exerting pressure on the inner walls of said skirt along a line at right angles to the axis of the piston pin bosses; but in addition thereto the expander is so constructed that it may be easily inserted into and removed from the piston skirt.

A further object of the invention is to embody in the expander means for adjusting the amount of spring tension that may be exerted against the piston wall, said means serving at the same time to cause the expander to be wedged into place whereby it is securely held within the piston.

A further object is to provide an expander that requires no special supporting means but is securely held in place by a wedging action between the piston pin bosses and the piston skirt.

In addition to these objects I have provided a piston skirt expander that is simple and one that may be manufactured at comparatively low cost and one that at the same time is durable and will perform satisfactorily over a long period of time.

These advantages, as well as others inherent in the invention, will be better apparent from a detailed description of the same in connection with the accompanying drawing, in which:

Figure 1 is a combination side elevation and middle vertical section taken through a conventional type of piston showing one of my improved skirt expanders in operating position within the piston skirt and exerting its tension thereon; Fig. 2 is a bottom plan of the piston showing a pair of my improved skirt expanders disposed in opposing relation between the piston pin bosses and the piston skirt wall; Fig. 3 is a vertical longitudinal section taken through the piston on a plane indicated by the line 3—3 of Fig. 1; Fig. 4 is a vertical longitudinal section similar to Fig. 3 except that one of the expanders is shown positioned within the piston skirt but not yet put into condition to place tension thereon; and Fig. 5 is a detached elevational view looking toward the expander from the side thereof that engages with the piston skirt.

Referring to the drawing, P represents a piston of typical construction having the usual piston pin bosses 1, 1 for supporting a piston pin 2, which holds the connecting rod 3 and the piston P in operative relation. As is generally understood in the art, after the piston P has been in use for some time, the skirt portion thereof wears and often becomes distorted so that it no longer fits properly in the engine cylinder. When this condition becomes severe the piston must either be replaced or restored to its proper shape. In the majority of instances the wear is not sufficiently severe to require replacement of the piston and the latter may be reshaped by inserting within it a pair of skirt expanders as illustrated in Figs. 1 to 5 inclusive.

The skirt expander forming the subject of the present application is of the general type that requires the use of a pair which are arranged within the piston skirt in opposing relation, as shown in Figs. 2 and 3, and held securely by being wedged between the bosses 1, 1 and opposite sides of the piston skirt S. The manner in which this is accomplished will presently appear.

My improved expander comprises a U-shaped stamping 4 and a tensioning bolt 5, the expander being formed with diverging top and bottom portions 6, 6 (which form the sides of the U) of the general shape of a trapezoid, having their free edges terminating in arcuate flanges 7, 7 curved to conform to the general curvature of the piston skirt. The top and bottom portions 6, 6 of the expander are connected by inwardly curved members 8, 8 spaced apart a sufficient distance so that they will span from one pin boss 1 to the other, as shown in Figs. 1 and 2. The curved marginal members 8, 8 are for engagement with the pin bosses and may be positioned adjacent the bosses through the open bottom of the piston when the top and bottom members 6, 6 are in their freely expanded condition as shown in Fig. 4. After the expander is thus positioned, nut n is screwed over the threaded extremity of bolt 5 disposed in perforated bosses 9, 9 formed in the members 6, 6, and said nut is drawn up sufficiently to force the top and bottom members 6, 6 together, as shown in Fig. 3, which causes the curved members 8, 8 to embrace the bosses 1, 1 and at the same time bends the flanges 7, 7 backwardly so as to exert the required amount of tension between the piston skirt S and said piston bosses. Obviously this tension can be controlled up to the point where the top and bottom members 6, 6 are brought into parallelism which of course would give the maximum amount of tension against the piston skirt.

From the foregoing it is apparent that the expander comprises two essential elements, one of which is the stamping 4 which serves as a wedging member and the other the bolt 5 which, together with the nut $n$, serves as a tensioning member. After the wedging member 4 has been properly positioned so that the boss engaging elements 8, 8 are adjacent to the opposed bosses 1, 1, the wedging member 4 is wedged in place by drawing the top and bottom members 6, 6 together by means of the bolt 5 and nut $n$. In this operation the bosses 1, 1 serve as abutments for the boss-engaging elements 8, 8 so as to exert pressure against the skirt S as the top and bottom 6, 6 are drawn together. As the wedging member 4 is wedged between the skirt and the bosses, the arcuate flanges 7, 7 will be bent upwardly so as to fit snugly against the skirt S and exert considerable spring pressure against said skirt. Obviously the top and bottom 6, 6 will also be under tension so as to contribute to this spring tension and at the same time impart a certain amount of yielding action or resilience into the device as a whole.

During the wedging of the member 4 not only is the spring tension thereof increased but the boss-engaging elements 8, 8 will also assume increased contact with the bosses 1, 1 as they will also bend somewhat to conform to the contour of said bosses. This also increases the grip of said members on the bosses causing the expander to be even more securely held in place.

In the Figs. 1, 2 and 3 the expanders are shown in condition so as to exert the required amount of tension against opposite sides of the piston skirt at right angles to the axis of the pin bosses, while in Fig. 4, as stated, no tension has been placed on the expander but it has been merely put into position to engage the piston pin bosses.

In Fig. 4 the degree of divergence of the top and bottom members 6, 6, as well as the amount the flanges 7, 7 have to yield when tension is imposed on the wedging member, are somewhat exaggerated for the purpose of clarity. The exact proportions and dimensions of the expander must of necessity have to be determined according to the size thereof and the construction of the piston in which the expander is to operate.

It is apparent that the stamping 4, being made of spring metal, will exert a yielding tension against opposite sides of the piston skirt but at the same time will be wedged in place between said skirt and the bosses so tightly that it will not be shaken loose or dislodged during the operations of the piston.

While I have described my improved piston skirt expander as being used within the piston as a pair, that is, one on each side of the bosses and exerting tension on opposite sides of the piston skirt, I do not wish to be understood as specifically limiting my improved expander to such use. Since each expander operates individually and is not dependent on the other for imposing tension against the side of the piston skirt against which it bears, it is entirely feasible to use but one expander disposed within the piston to exert its pressure against whichever side thereof shows the greatest wear.

Having described my invention, I claim:

1. In combination with a piston having a skirt and oppositely disposed pin bosses, a skirt expander comprising a U-shaped wedging member and a tensioning member therefor spanning said wedging member, said wedging member being disposed between the bosses and the skirt and caused to exert pressure against said skirt with the bosses as an abutment by the action of the tensioning member.

2. In combination with a piston having a skirt and oppositely disposed pin bosses, a skirt expander comprising a wedging member and a tensioning member therefor, said wedging member comprising a U-shaped stamping having top and bottom members connected by marginal cross-members spaced to span from one boss to the other, said top and bottom members having flanges to contact with the skirt, and the tensioning member being operable on the top and bottom members of the stamping to vary their spacing and thereby adjust the expander pressure against the skirt.

3. In combination with a piston having a skirt and oppositely disposed pin bosses, a skirt expander comprising a U-shaped wedging member and a tensioning member therefor spanning the wedging member, said wedging member being disposed between the bosses and the skirt and having suitable formations for engaging both bosses as an abutment member to exert pressure against the skirt by the action of the tensioning member.

4. In combination with a piston having a skirt and oppositely disposed pin bosses, a skirt expander comprising a U-shaped wedging member and a tensioning member therefor, said wedging member having oppositely disposed spring elements in contact with the piston skirt and spaced boss-engaging elements formed integrally therewith, said boss-engaging elements spanning from one boss to the other.

5. In combination with a piston having a skirt and oppositely disposed pin bosses, a skirt expander arranged within the skirt and bearing against the bosses and part of the skirt therebetween, and means for placing the expander under tension to impose pressure on the piston skirt, said expander having arcuate flanges in spaced relation for contacting the skirt.

6. In combination with a piston having a skirt and oppositely disposed pin bosses, a skirt expander comprising a U-shaped wedging member of spring steel and a tensioning member therefor spanning the wedging member, said wedging member being disposed between the bosses and the skirt and caused to exert pressure against said skirt with the bosses as an abutment by the action of the tensioning member.

7. In combination with a piston having a skirt and oppositely disposed pin bosses, a skirt expander comprising a wedging member and a tensioning member therefor, said wedging member being disposed between the bosses and the skirt and having suitable formations for engaging both bosses as an abutment member to exert pressure against the skirt by the action of the tensioning member, and said wedging member being made of resilient material so as to have a yielding action when wedged in place.

8. In combination with a piston having a skirt and oppositely disposed pin bosses, a skirt expander bearing against the bosses and the part of the skirt therebetween, and means for placing the expander under tension to impose pressure on the piston skirt, said expander having arcuate extremities in spaced relation for contacting the skirt.

CHARLES A. MARIEN.